(12) United States Patent
Armano et al.

(10) Patent No.: US 8,401,866 B2
(45) Date of Patent: *Mar. 19, 2013

(54) BUSINESS PRACTICES ALIGNMENT METHODS

(75) Inventors: Michael Joseph Armano, North Andover, MA (US); Sara J. Moulton Reger, Scottsdale, AZ (US)

(73) Assignee: International Business Machines Corporation, Armonk, NY (US)

( * ) Notice: Subject to any disclaimer, the term of this patent is extended or adjusted under 35 U.S.C. 154(b) by 1823 days.

This patent is subject to a terminal disclaimer.

(21) Appl. No.: 10/708,962

(22) Filed: Apr. 2, 2004

(65) Prior Publication Data

US 2005/0222850 A1 Oct. 6, 2005

(51) Int. Cl.
*G06F 17/60* (2006.01)

(52) U.S. Cl. ............ 705/1.1; 707/1; 709/204; 434/236

(58) Field of Classification Search ............... 707/104.1, 707/1; 709/204; 434/236; 705/1.1
See application file for complete search history.

(56) References Cited

U.S. PATENT DOCUMENTS

| | | | | |
|---|---|---|---|---|
| 6,513,154 | B1 | 1/2003 | Porterfield | 717/101 |
| 6,556,974 | B1 | 4/2003 | D'Alessandro | 705/10 |
| 6,842,751 | B1 * | 1/2005 | Vilalta et al. | 707/6 |
| 2003/0110067 | A1 | 6/2003 | Miller et al. | 705/8 |

OTHER PUBLICATIONS

Trompenaars, Woolliams; A new framework for managing change across cultures, Feb. 18, 2003, Journal of Change Management vol. 3,4; pp. 361-375, Henry Stewart Publications.*

Can Two Rights Make a Wrong? Insights from IBM's Tangible Culture Approach, c 2006, Sara J. Moulton Reger; IBM Corporation, Entire Book; Chapter 1 Introduction.*

Manley et al., "Understanding Organizational Culture and Its Role in Organization Transformation and Development," *Proceedings of the 1998 International Conference on Engineering and Technology Management*, Oct. 11-13, 1998, San Juan, Puerto Rico, USA, pp. 342-349.

Hume et al., "Organizational Prototyping: Embarking on Organizational Transformation," *Proceedings of the 1998 Conference on Computer Personnel Research*, Mar. 26-28, 1998, Boston, Massachusetts, USA, pp. 45-48.

Carlson, PhD, "Information Technology and Organizational Change," *Proceedings of the 17th Annual International Conference on Computer Documentation*, Sep. 12-14, 1999, New Orleans, Louisiana, USA, pp. 26-35.

(Continued)

*Primary Examiner* — Jami A Plucinski
*Assistant Examiner* — Kimberly Evans
(74) *Attorney, Agent, or Firm* — IP Authority, LLC; Ramaj Soundararajan (57) ABSTRACT

A method to align and effectively apply business practices or culture within the business units in one or more business entities is provided. In the first phase, a practices charter defining future state business practices is developed. A practices charter is developed from an initial set of differing alternatives statements regarding future business practices, in view of a right-versus-right spectrum. A practices charter is an output of the reconciliation of differing alternatives statements in right-versus-right spectrums. In a second phase, a practices charter is applied to hypothetical issues to develop realistic outcome narratives describing hypothetical situations and dilemmas. In a third phase, discrepancies between outcome narratives and a current state of business practice are identified, and a prioritized action program is developed to address identified discrepancies. Finally, progress is evaluated by utilizing outcome narratives to identify achievements and to target areas needing further improvement and additional actions.

2 Claims, 5 Drawing Sheets

OTHER PUBLICATIONS

Boudreau et al., "Organizational Transition to Enterprise Resource Planning Systems: Theoretical Choices for Process Research," *Proceedings of the 20th International Conference on Information Systems*, Dec. 13-15, 1999, Charlotte, North Carolina, USA, pp. 291-299.

Olson, "Transformation and Technology," *Proceedings of Groupware '92*, Aug. 2-5, 1992, San Jose, CA, USA, pp. 111-112.

Hampden-Turner et al., *Building Cross-Cultural Competence: How to Create Wealth from Conflicting Values*, Yale University Press, Oct. 2000, pp. 350-352.

Trompenaars et al., *Culture for Business Series: Business Across Cultures*, Capstone Publishing Ltd, Feb. 2004, pp. 30-32, 114, 144, 148, 303-305.

\* cited by examiner

BUSINESS PRACTICES ALIGNMENT METHODS

BACKGROUND OF INVENTION

1. Field of Invention

The present invention relates generally to the field of business methods and practices. More specifically, the present invention is related to discrepancy assessment, definition, planning, and evaluation between a current state and a defined state of business practice.

2. Discussion of Prior Art

As business environments become more complex and the number of multi-organization combinations increases, effectively clarifying desired changes and outcomes from a detailed business practices perspective becomes vital to the success and sustenance of overall business objectives. Business practices are key aspects of business organizations determining how an organization operates and how business is performed within an organization. They have a strong impact on what people do and how they do it, and what is deemed acceptable and unacceptable. Business practices are also a reflection of underlying behaviors, beliefs, values, assumptions, and mindsets held in common across an organization. This common underlying core of business practices is frequently referred to as culture.

Business practices are often seen as either an enabler or a barrier in the pursuit of goals that an organization has set for itself. If current business practices are well aligned with what an organization wants to do and how it wants to do it, current business practices will enable the achievement of desired outcomes. However, if current business practices are not well aligned or if there are conflicting sets of business practices within the organization or with other organizations required to achieve the goals, current business practices become a barrier to desired outcomes.

Circumstances in which current business practices are often a barrier include:
  mergers or acquisitions in which two or more companies combine business structures to achieve new business results (e.g., HP/Compaq merger, IBM's acquisition of PricewaterhouseCoopers Consulting);
  partnerships or alliances in which two or more companies work collaboratively and leverage their capabilities, while remaining separate and distinct entities (e.g., e-marketplace, joint venture, venture capital funding for an entrepreneurial venture); and
  significant company transformations in which changes to business practices or existing culture must occur within an organization (e.g., bankruptcy, IBM's On Demand vision, combination of two or more autonomous business units, implementation of a shared services model).

At the core of each of these circumstances lie several factors necessitating consideration:
  individually and collectively, people carry perceptions, experiences, history, opinions, knowledge, skills, and preferences into these circumstances;
  there exist a number of different methods to successfully perform work;
  reconciling differences of opinion and preference to identify the "right" answers for a given circumstance can be difficult;
  objectively measuring the degree of change that has occurred with respect to business practices and culture is difficult; and
  significant transformation and integration efforts are lengthy, and often take years before they are considered self-sustaining.

The method of the present invention targets solutions to problems related to circumstances requiring business practice or culture synchronization. Thus, a focused, tangible, and systemic method is provided for organizations seeking to transform their business practices or cultures, or seeking to integrate or align their business practices or culture with that of one or more other organizations.

At a high level, there are three steps in the process of synchronizing one or more business entities. The first step is to determine the direction a participating entity will take through the definition of vision, mission, strategy, or objectives. The second step is to make business value decisions in view of a determined direction. Lastly, decisions are executed or implemented, thus ensuring that a targeted business value is achieved. In each of these steps, business practices and culture must be considered.

During an implementation or execution step, desired changes and outcomes are clarified. However, defining desired changes and outcomes in a way that is clearly actionable might require further consideration. Compounding this issue is the fact that there are typically several actionable alternatives to take in the pursuit of a goal. Conflicting versions of alternatives are also likely to be in current practice throughout a single organization and are highly likely to exist between organizations.

Prior art approaches to dealing with synchronizing, transforming, integrating, or aligning business practices and cultures are summarized in two basic approaches; an attribute and behavior approach and a principle and value approach. Both approaches are similar in that they seek to define aspects of a desired future state of business, define and communicate priorities, and are comprised of a few, key, high-level components. Also, both tend to describe a future state of business with discrete terms that are implied as equally weighted.

The focus on visible attributes and behaviors within an environment help to make aspects of a future state of business practice more tangible, objective, and measurable. However, attributes and behaviors are not likely to be fully understood unless communicated in a way that conveys desired and undesired outcomes, and how such outcomes are achieved in practice. Additionally, focusing on behaviors may do little to change the mindsets and belief systems of those performing work required to achieve desired outcomes. Without changes in thinking, particularly in terms of what is "right" for a given environment, it is more difficult to achieve permanent or self-sustaining change. Also, the definition of desired attributes and behaviors is frequently abstract and separated from the issues people are likely to experience, thus the definitions are inadequate to address differing opinions of what is expected. Such focus may provide less clarity regarding future expectations. If a group reconciliation process is used to identify attributes and behaviors, there is likely to be a high degree of commitment to those attributes or behaviors. However, without a method to predict how attributes and behaviors are incorporated into realistic work situations and dilemmas, it is likely that conflict will arise.

Because a principle and value approach seeks to define a desired future state of business in terms that identify priorities and what is appropriate for a given environment at a high level, such definitions are typically abstracted and disconnected from a real work context. Without a more tangible, visual way to describe expectations of business practice and workflow, little change may occur. The reasons for this are that people are not likely to fully grasp the ramifications of the desired changes, or worse, may believe that their actions already correspond to the desired changes since they agree with them intellectually. A principle and value approach states expectations in terms of singular statements with varying level of detail. Without contrasting statements and statements in which true differences of mindset and opinion exist within an environment, those implementing decisions may have little context to take appropriate action.

Either prior to or subsequent to the development of attributes and behaviors or principles and values defining a desired future state of business practice, a definition of the current state of business practice may be developed. Current state definitions are created to enable a gap assessment. An assessment seeking to objectively identify what is most likely to help create and drive the changes is more beneficial than an approach that simply relies on opinion. However, without the benefit of a discrete definition of future state of business practice expectations, it is common for people to work actively to manage the implications of business practice change to their best advantage.

Whatever the precise merits, features, and advantages of the above cited references, none of them achieves or fulfills the purposes of the present invention.

SUMMARY OF THE INVENTION

The system and method of the present invention provide for effective application of business practices within the business units in one or more business entities. In the first phase, a practices charter defining future state business practices is developed. A practices charter is developed that contains the reconciliation of right-versus-right spectrums. In a second phase, a practices charter is applied to develop realistic outcome narratives describing desired handling for hypothetical situations and dilemmas. In a third phase, discrepancies between outcome narratives and a current state of business practice are identified, and a prioritized action program is developed to address identified discrepancies, or barriers. Finally, progress is evaluated by utilizing outcome narratives to identify achievements and to target areas needing further improvement and additional actions. The combination of these phases comprises an end-to-end method for transforming, integrating, synchronizing, and aligning business practices or cultures.

A practices charter is comprised of decisions about key ways of performing actions and methods of performing actions at a detailed, actionable level. It is created by the identification of realistic alternatives that are conflicting with, or in tension with, other realistic alternatives. Alternatives reflect aspects of either a current state of business practice or a projected future state of business practice, including optional approaches, mindsets, and priorities, both of which are viewed as reasonable by one or more of parties familiar with a current environment and objectives of a business transformation.

Conflicting alternatives statements are paired in view of a spectrum model. The spectrum of the present invention is referred to as a right-versus-right spectrum; it reflects conflicting aspects of alternatives that parties have determined as plausible and realistic, although not necessarily equally so. A right-versus-right spectrum is used to define conflicting and overlapping alternatives, and may incorporate attributes and behaviors, principles and values, as well as other business practice drivers such as mindsets, expectations and work style. A right-versus-right spectrum is also used to determine priorities among topics.

Input for right-versus-right spectrums is obtained from specified parties involved in business synchronization. Subsequently, a reconciliation process is initiated, during which one of the alternatives is selected and the other rejected, or a combination of both alternatives is selected. As a final step of developing a practices charter, agreement regarding alternatives between specified parties within an organization or organizations is reached.

To aid the reconciliation process, an unevenly weighted scale is used. In a typical five-point scale, each of point represents an equal distribution of the total points in the scale. In reconciling differences between point values, conflict may arise due to the coarse granularity of such a scale; thus, a magnitude of conflict would appear to be greater. To combat these difficulties, an unevenly weighted scale is utilized.

In a second step of the method of the present invention, outcome narratives are developed. Tenets illustrated by a previously developed practices charter are applied to situations and dilemmas to develop outcome narratives. Situations and dilemmas of interest are circumstances requiring decisions and necessitating cooperation to achieve desired outcomes, situations being issues with a relatively small number of roles or a generally agreed upon preferable outcome and dilemmas being issues with a relatively large number of roles or general disagreement on preferable outcome. In applying agreements resulting as outcome from reconciled right-versus-right spectrums to develop outcome narratives, reference is made to a previously developed practices charter.

In the third phase of the method of the present invention, discrepancies between outcome narratives and a current state of activities are resolved by developing a prioritized action program. The identification of discrepancies, known as gap assessment, is performed after defining a work context. An assessment that is grounded in literal description of a work context is less likely to be vague or subject to debate. During gap assessment, implications of business transformation are elucidated. If a particular outcome narrative or its implications are not aligned with the goals of each participating entity, a practices charter is re-visited to ensure decisions embodied therein have been applied correctly to a current hypothetical circumstance.

In the fourth phase of the method of the present invention, progress is evaluated by using outcome narratives to identify achievements and targeting areas needing further improvement and additional actions. Additional actions are comprised of identifying and resolving new or continuing discrepancies from previous outcome narratives and developing further outcome narratives and subsequently performing additional gap assessments until a desired state of business practice is reached and is considered self-sustaining.

DESCRIPTION OF THE PREFERRED EMBODIMENTS

While this invention is illustrated and described in a preferred embodiment, the invention may be produced in many different configurations. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

Figure 1:
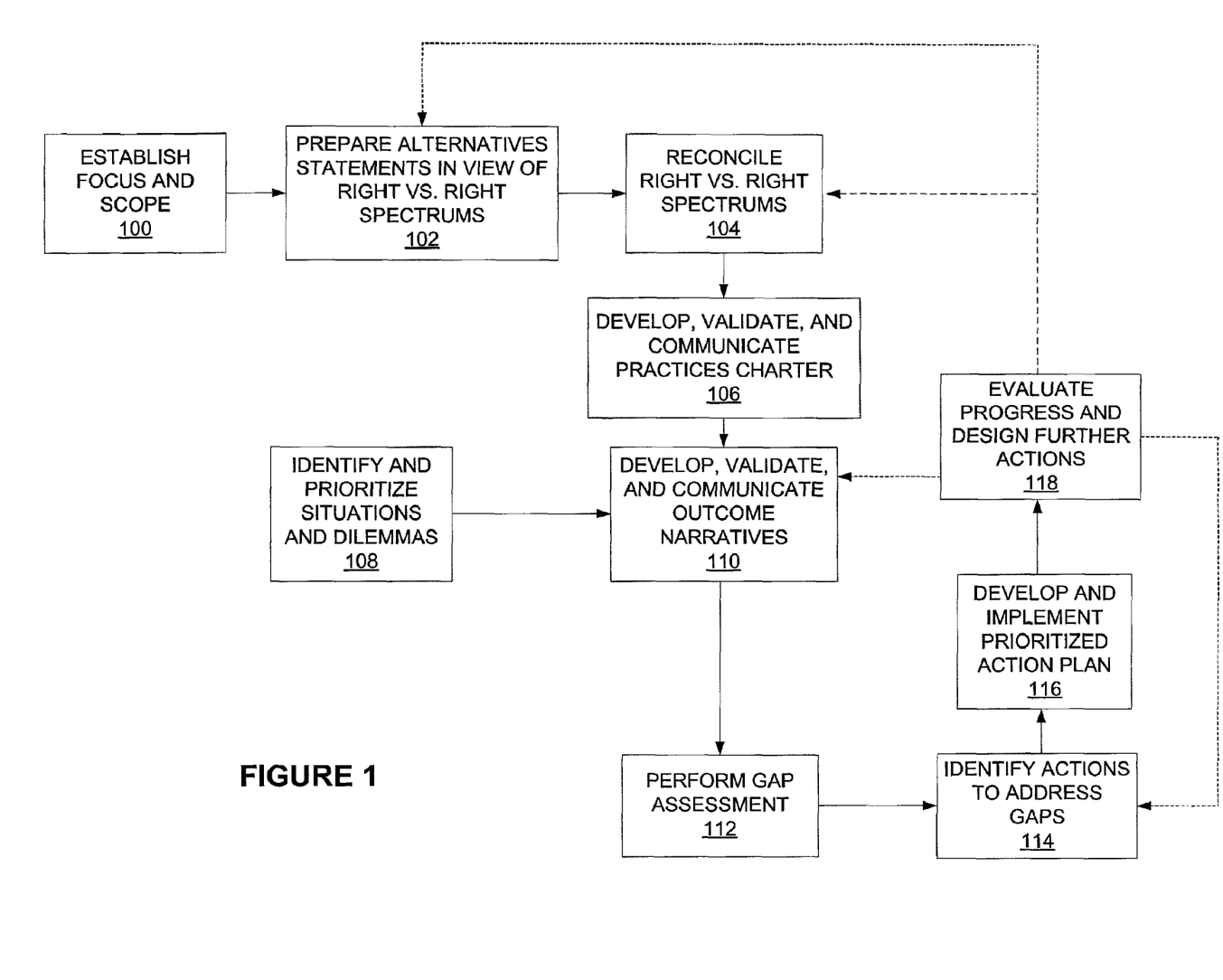
FIG. 1 illustrates a general process flow diagram of the present invention.

Referring now to FIG. 1, a business method process flow of the present invention is shown. In step 100, focus and scope are established by a participating entity or entities in a synchronization of business practices or culture. Subsequently, alternatives statements personifying the entity's or entities" goals are drafted in view of an unevenly weighted scale, or a right-versus-right spectrum in step 102. As a result of right-versus-right reconciliation in step 104, a practices charter communicating decisions is developed in step 106. Tenets from a practices charter are used as an input in the development, validation, and communication of outcome narratives in step 110. Also provided as an input to the development of outcome narratives are situations and dilemmas that have been identified and prioritized in step 108. A gap assessment between a current state of business practice and outcome narratives developed in step 110 is performed in step 112. Results of a gap assessment are used to identify actions to address gaps in step 114, which is subsequently followed by the development of a prioritized action plan in step 116. Finally, progress is evaluated and further actions are designed in step 118. Actions include identifying additional actions to address new or continuing discrepancies as in step 114, preparing new alternatives statements as in step 102, reconciling subsequent new or revised right-versus-right spectrums as in step 104, and preparing new outcome narratives as in step 110.

Development of Practices Charter

In a first phase of the method of the present invention, a practices charter defining a future state of business practices is developed. Goals and intent for synchronizing a combined business entity, collaborating effort of a combined or distinct business entities, or transformations of all or units within a single entity, are elicited via interviews with key leaders of a participating entity or entities. Synchronizing goals are applied to business situations including, but not limited to: mergers, acquisitions, partnerships, joint ventures, alliances, e-marketplace; vision, mission, strategy, improvement, growth or contraction transformation; bankruptcy restructuring and recovery, business model or organizational restructuring, start-up companies, venture capital investments, and initial public offerings (IPO). Along with goals, additional supporting information indicating priorities and intent of entities involved in synchronization is obtained. In the second step, detailed alternatives statements supporting elucidated goals and priorities and embodying reasonable perspectives are derived.

Figure 2:
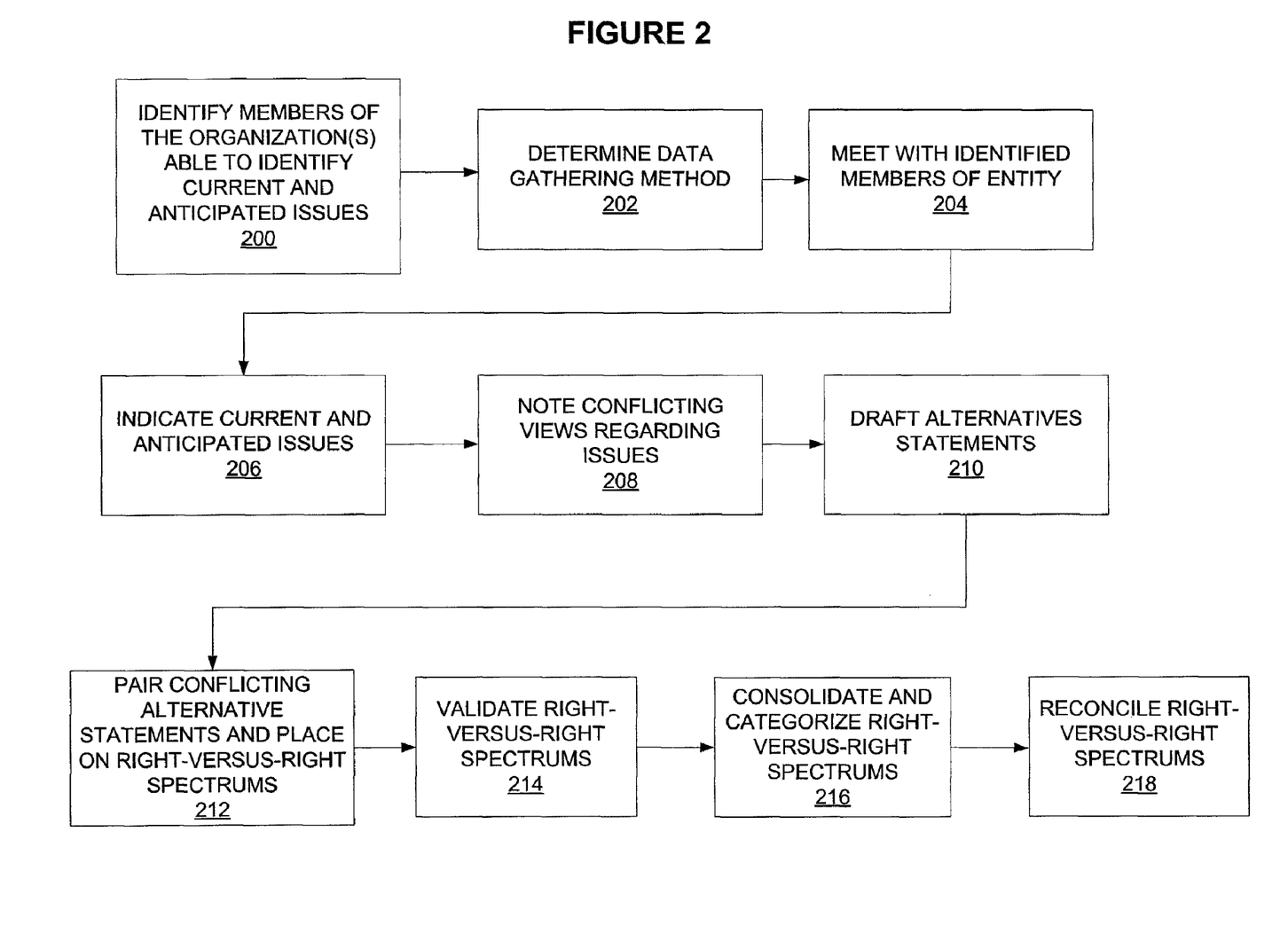
FIG. 2 is a process flow diagram illustrating the development of right-versus-right spectrums.

Shown in FIG. 2 is a process flow diagram of initial steps in the development of detailed alternatives statements. Stakeholders determined to be needed from a participating entity or entities, or those having the capability to identify current and anticipated issues in step 200 are selected to participate in the identification of conflicting alternatives in view of right-versus-right spectrums. A data collection process in view of a right-versus-right spectrum occurs by interviewing identified members, (e.g., key leaders or managers) of an entity or entities involved in synchronization, performing roles at various levels within an entity. In step 202, a data gathering method is determined. Following in steps 204 and 206, current and anticipated issues are raised and defined. Following interviews, expectations, assumptions, frustrations, concerns, and areas of strife originating from differing approaches, philosophies, and priorities are identified. Documenting the results of an interview allows identification of conflicting points of view raised by those involved in the interview process. Conflicting views regarding raised issues are noted in step 208 and are subsequently used to draft alternatives statements in step 210. Alternatives statements are then paired, and conflicting statements are negotiated in view of a right-versus-right spectrum. In step 212 conflicting alternatives statements are paired and placed on a right-versus-right spectrum. Subsequently, in steps 214 and 216 right-versus-right spectrums are validated, then consolidated and categorized, respectively. Additionally, in validating right-versus-right spectrums in step 214, an approach to prioritize validated right-versus-right spectrums is also identified. Lastly, in step 218, right-versus-right spectrums are reconciled.

Alternatives statements in contrast with one another are regarded in view of separate ends of a right-versus-right spectrum wherein both ends of such a spectrum are plausible and realistic, although not necessarily equally plausible and realistic, given a specific circumstance. Shown in Table 1 are examples of differing or conflicting alternatives statements.

TABLE 1

| illustrates examples of different alternatives statements | |
|---|---|
| On projects, adherence to schedule is more important than adherence to project budget | On projects, adherence to project budget is more important than adherence to schedule |
| Innovation is equally important to finding cost savings | Cost savings are more important than innovation |
| Adherence to established quality standards will be top priority, even if it means creating cost or schedule issues | Cost or schedule issues can be reasons to make appropriate near-term trade-offs in the established quality standards, but only to the extent that customer requirements are not compromised |
| Process requirements can be bypassed only with approval of the next level of management | Process requirements can be bypassed if justifiably deemed to be an inhibitor to customer satisfaction in a given circumstance |

Right-Versus-Right Spectrums

Right-versus-right spectrums are reviewed by members of an entity or entities participating in synchronization to ensure that listed alternatives pairs represent plausible, realistic, and reasonable solutions to conflicts and issues that may arise. As an output of the process shown in FIG. 2, paired alternatives statements on right-versus-right spectrums illustrating detailed, contrasting, yet plausible approaches are listed. Right-versus-right spectrums are consolidated into categories, such as decision making and process execution, to facilitate organization and communication of decisions. Facilitating reconciliation of determined right-versus-right spectrums additionally occurs through dialogue where trade-offs, considerations, and context are explored and established.

To reconcile alternatives statements in view of a right-versus-right spectrum; alternatives statements are positioned on a five-point scale; wherein the leftmost area represents a totality of points toward one alternatives statement in a pair and the rightmost area represents a totality of points toward an opposing alternatives statement in a pair. An area directly in between both alternatives represents a fifty-fifty split in points, and the remaining areas are designated as a majority of points with regards to a proximate alternatives statement. A rightmost or leftmost area representing a totality of points is an indication of a particular alternatives statement being applicable in all situations. A fifty-fifty split area indicates both alternatives statements are equally applicable, albeit in different situations. Lastly, remaining majority areas indicate that a solution "leans" toward a particular alternatives statement a particular alternatives statement is more applicable than an opposing alternatives statement in a majority of situations. Shown in Table 2 is an example of alternatives statements on a right-versus-right spectrum.

TABLE 2

Examples of alternatives statement on a right-versus-right spectrum
Right vs. Right Spectrums

| Alternatives | 100% | 99–51% | 50/50% | 51–99% | 100% Alternatives |
|---|---|---|---|---|---|
| On projects, adherence to schedule is more important than adherence to project budget | | | | | On projects, adherence to project budget is more important than adherence to schedule |
| Innovation is equally important to finding cost savings | | | | | Cost savings are more important than innovation |
| Adherence to established quality standards will be top priority, even if it means creating cost or schedule issues | | | | | Cost or schedule issues can be reasons to make appropriate near-term trade-offs in the established quality standards, but only to the extent that customer requirements are not compromised |
| Process requirements can be bypassed only with approval of the next level of management | | | | | Process requirements can be bypassed if justifiably deemed to be an inhibitor to customer satisfaction in a given circumstance |

In reconciliation of a right-versus-right spectrum, key leaders needed to discuss, decide, and approve alternatives statements included in a right-versus-right spectrum are identified. Once identified, individual perspectives are obtained from key leaders by asking them to provide one choice in each right-versus-right spectrum. The opportunity to designate further granularity is offered as needed. In one embodiment, granularity is refined by wording changes or the creation of additional right-versus-right spectrums.

Input provided by key leaders is consolidated and distributed to decision-makers for review and consideration. To aid in this endeavor, right-versus-right spectrums are prioritized with respect to degree of reconcilability. Right-versus-right spectrums deemed most agreeable to a majority of key leaders are assigned a higher priority than those spectrums having a lesser degree of agreement between key leaders. Subsequent to prioritization, working sessions are scheduled to discuss and reconcile decisions among paired alternatives statements on right-versus-right spectrums, seeking to identify the answer best reflecting consensus or democratic decision among key leaders. Key points of discussions are collected along with details augmenting and clarifying decisions made during working sessions. Decisions and discussion are consolidated into a practices charter that is used to communicate decisions to remaining, implementing parties in an entity or entities and is also used as basis for the creation of outcome narratives.

As output of this phase, right-versus-right spectrums, decisions on right-versus-right spectrums, documented discussion, and a practices charter are produced.

Outcome Narratives

In a third phase of the method of the present invention, a practices charter developed from the reconciliation of right-versus-right spectrums is applied to situations and dilemmas to assist in the subsequent creation of outcome narratives. As a preliminary step, currently existing issues or issues likely to exist in the future are identified. Issue statements are developed into situation and dilemma statements discrete enough to be actionable. Situations are definitions of issues where a desired outcome is generally agreed upon even though a common method for reaching a desired outcome is not agreed upon and dilemmas are definitions of issues in which there is disagreement as to a desired outcome as well as to a method of achieving a desired outcome. Next, it is determined whether each hypothetical issue represents a situation or dilemma. Lastly, a realistic, yet fictionalized, statement of each prioritized situation or dilemma that briefly represents the circumstances to an adequate level to be ready for decisions and actions is created. Shown in table 3 are examples of adequately defined and inadequately defined situation and dilemma statements.

TABLE 3 shows examples of adequate and inadequate situation and dilemma statements.

| Adequate situation statement | Inadequate situation statement |
|---|---|
| An employee has escalated an important, time-sensitive project issue to a high level of management without following the prescribed escalation processes | An employee has failed to follow the escalation processes |

| Adequate dilemma statements | Inadequate dilemma statements |
|---|---|
| A disagreement exists between a relationship manager who wants to get approval for a proposed customer contract and the Finance manager that needs to | A disagreement exists between a relationship manager and a Finance manager |

TABLE 3-continued shows examples of adequate and
inadequate situation and dilemma statements.

| | |
|---|---|
| approve that contract. The disagreement centers around the relationship manager's level of authority since the contract value is above official authority levels | |
| A resource assigned to a project previously communicated a scheduled vacation at a time that is now deemed to require her presence for successful roll-out | A resource requests to take a vacation at a difficult time on a project |

As an output of this phase, realistic situation and dilemma statements representing current or anticipated issues associated with a business synchronization effort are determined. Situation and dilemma statements are prioritized and a practices charter developed in phase one of the method of the present invention is applied to each situation or dilemma statement to create outcome narratives. Outcome narratives are comprised of a desired outcome, in-scope roles, role behaviors and actions, and a preferred mode of performing actionable decisions. As part of an outcome narrative, a form comprising a situation or dilemma statement, applicable categories, a desired outcome, in-scope roles, role behaviors and actions, and applicable considerations is created.

Figure 3:
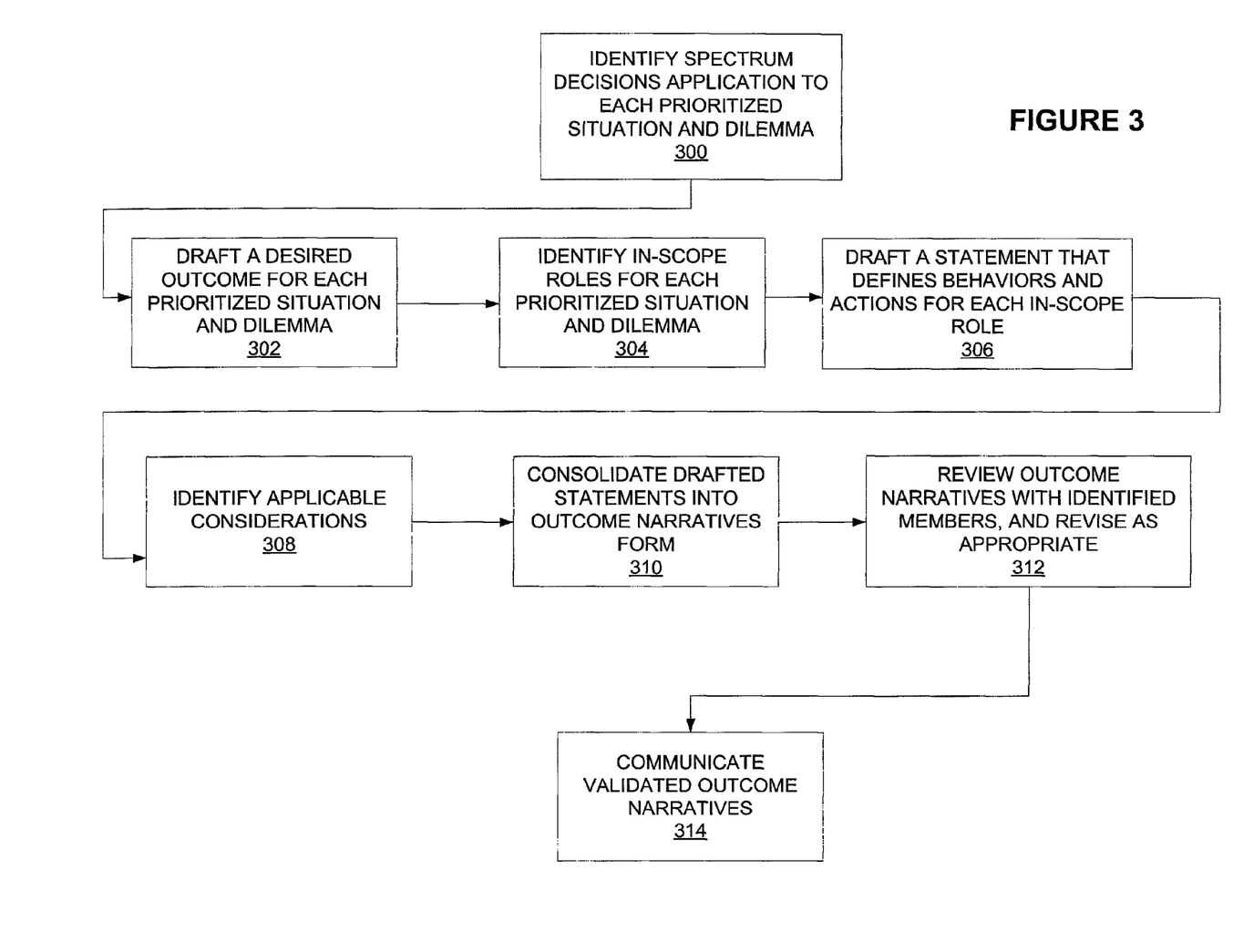
FIG. 3 is a process flow diagram illustrating the development, validation, and communication of outcome narratives.

Shown in FIG. 3 is a process for developing, validating and communicating outcome narratives. In step 300, a situation or dilemma statement is regarded in view of a practices charter to identify and document which previously determined right-versus-right spectrum decisions are applicable. A practices charter is also used to develop a desired outcome for each situation or dilemma indicating a preferred mode of handling and indicating primary factual aspects of a decision in step 302. Emphasis is placed on clarifying information such as: actions that are taken to review and understand a situation or dilemma, actions that are taken, and with whom, to discuss and determine a resolution, exceptions that may exist, roles making decisions and how decisions are communicated, actions taken to mitigate negative implications, and actions taken to avoid a given situation or dilemma in the future.

For each identified and prioritized situation and dilemma, in-scope roles are identified in step 304. Using a desired outcome statement to identify in-scope roles, a statement is prepared that defines role behaviors and actions—activities and definitions of a desired way for each in-scope role to perform work on a particular situation or dilemma.

Focus is maintained on clarifying information that ensures a desired outcome will be produced in a desired manner, for example:
 a mindset for handling that situation or dilemma,
 in-scope role interactions with each other (e.g., collaboratively, prioritizing the request),
 in-scope roles method of addressing relationship and interpersonal aspects of a situation or dilemma, and
 activities and definitions of work methods performed by those holding in-scope roles to rectify negative implications resulting from a desired outcome.

Shown in table 4 is a consolidated outcome narratives form.

shows an Outcome Narratives Form

| | |
|---|---|
| Situation/Dilemma Statement: A disagreement exists between a relationship manager who wants to get approval for a proposed client contract and the Finance manager that needs to approve that contract. The disagreement centers around the relationship manager's level of authority since the contract value is above official authority levels | Desired Outcome: The relationship executive is responsible for the ultimate decision. The exceptions would be for financial implications that fall more than 2% outside the established levels of authority for that client relationship position. The identified escalation process should be used for the exceptions and other unusual circumstances, and an answer needs to be communicated within 48 business hours |
| In-Scope Roles: | Role Actions and Behaviors: |
| Client-facing leaders (Relationship Manager) Business advisors (Finance Manager) | Client-facing Leader: Needs to work actively, and with the intent of true resolution, to understand the reasons behind the objections and what is best for the client and company overall. Needs to seek ways to mitigate the risks and impacts by working collaboratively with Finance. Needs to seek others to help resolve and "mediate" the issues before escalation. Should ensure the next higher level client-facing leader concurs with the decision before implementation if mediation has not resolved the issues. If appropriate, needs to support the escalation process and constructively implement the decision from the escalation process. Should work actively to restore any relationships that suffered during the situation. Business Advisor: Needs to be objective about the concerns and ensure that the risk/issue is serious enough to warrant continued work vs. implementing the relationship leader's preferred course of action. Needs to work collaboratively to mitigate the risks/issues while meeting the client and company requirements. Should engage in "mediation" if an adequate resolution cannot be found. If appropriate, needs to support the escalation process. Should support and enact the final decision, whether it is made by the relationship manager or the escalation process. Should work actively to restore any relationships that suffered during the situation. |
| Applicable Categories: ☑ Decision Making ☑ Processes | Other Considerations: Size of the overall client relationship; history of financial dealings with that client; track record for decision making |

| | |
|---|---|
| ☑ Communications<br>☑ Execution<br>☐ Leadership Approach<br>☐ People and Development | by the relationship manager; criticality of the project for the business (to meet revenue targets, to gain an important qualification for this type of work) |

These roles are further specified in terms of behaviors drafted in step 306. Applicable considerations are identified in step 308. As an output of this phase, in step 310, a series of outcome narratives for prioritized situation and dilemma statements are produced and consolidated in outcome narratives forms. In step 312, these outcome narratives are reviewed, revised, and validated by key leaders to ensure proper application of a practices charter. Finally in step 314, validated outcome narratives are communicated to impacted personnel (e.g., individuals performing actionable items).

Gap Assessment and Progress Evaluation

Figure 4:
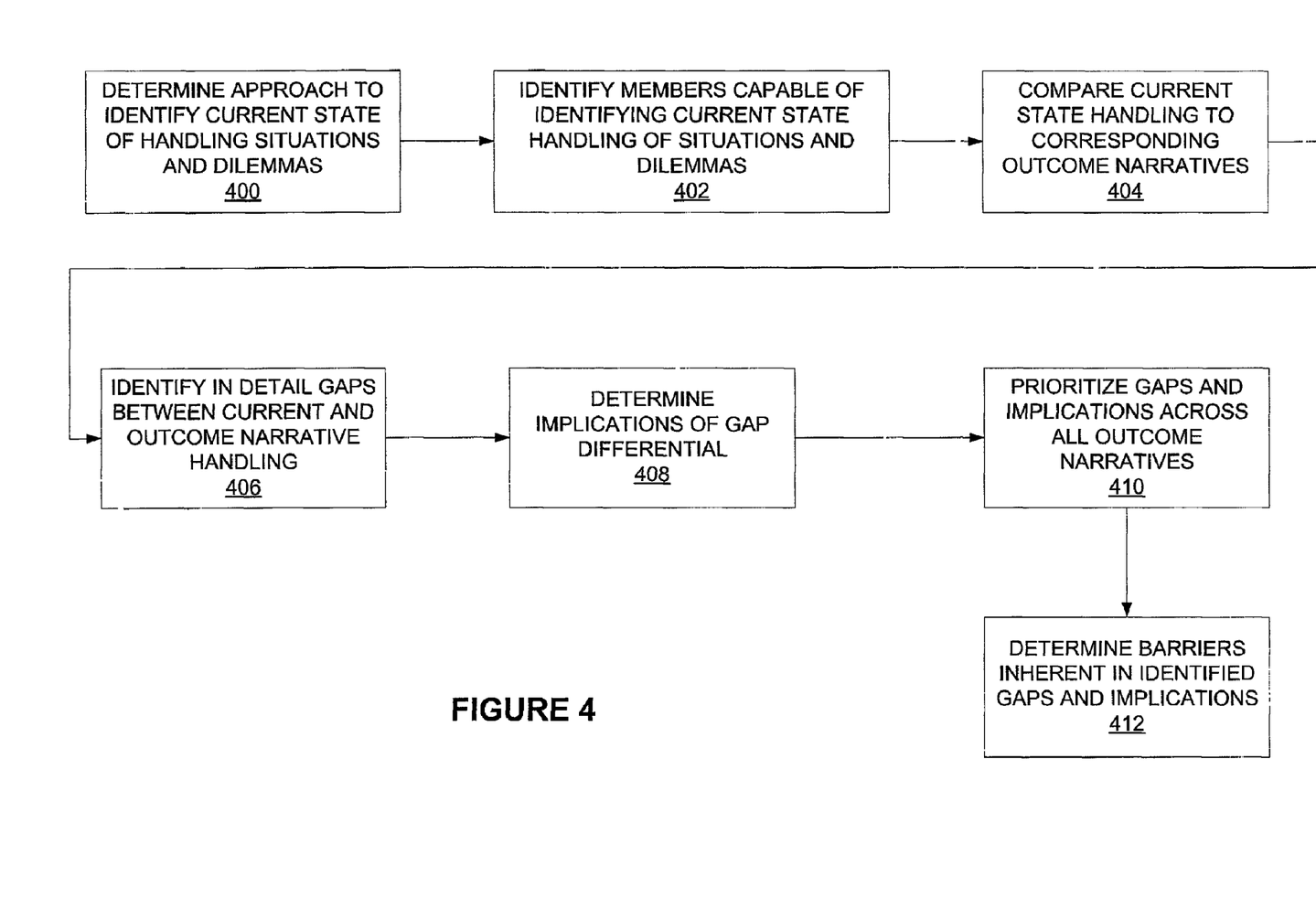
FIG. 4 is a process flow diagram illustrating gap assessment.

Shown in FIG. 4 is a process flow diagram illustrating how gap assessment is performed. As a fourth phase of the method of the present invention, discrepancies between outcome narratives and a current state of business practice are identified. A prioritized action program is developed to address identified barriers; it is first determined if further research into or definition of a current state handling of situations and dilemmas is needed. If so, discussions regarding current business practice state for handling situations and dilemmas are facilitated. Consequently, barriers inherent in identified gaps and implications are identified.

As preliminary steps to the process, an approach necessary to determine current state handling of situations and dilemmas is determined and members capable of identifying current state handling of situations and dilemmas are identified in steps 400 and 402, respectively. In step 404, outcome narratives are compared to a current state of handling situations and dilemmas to determine discrepancies by members selected in step 402 and an approach determined in step 400. Thus, gaps are identified and implications of identified gaps are determined. Shown in table 5 is an example of an assessment of gaps occurring between current state of handling situations and dilemmas and an outcome narrative.

TABLE 5 illustrates Gap Assessment between Outcome Narratives
Outcome Narrative #1: Gap Assessment Finance roles are currently decision-making and audit oriented, rather than decision-support and advice oriented
Relationship managers and Finance tend to do their decision making in isolation, and do not always respect the charter of each other's organizations
Finance processes contain narrow decision-making authorities for relationship managers
Relationship managers are not currently assigned with accountability and responsibility for all transactions within an account
Escalation processes are too slow and do not produce swift answers for issues that fall out of the authority levels In step 406, these discrepancies are identified in detail. These discrepancies, known as gaps, are used to develop a prioritized action program. Before such a program is developed, implications of gaps are determined in step 408. Subsequently, in step 410, gap assessment leads to a consolidation and prioritization of gaps and implications across outcome narratives. Gap assessment serves to identify barriers inherent to identified gaps and implications and to determine whether a validation of the gaps and implications is required in step 412. A gap assessment additionally serves as a basis to design and implement a prioritized action program of improvements to address identified barriers. Additionally, periodic timeframes in which progress is evaluated are identified.

Figure 5:
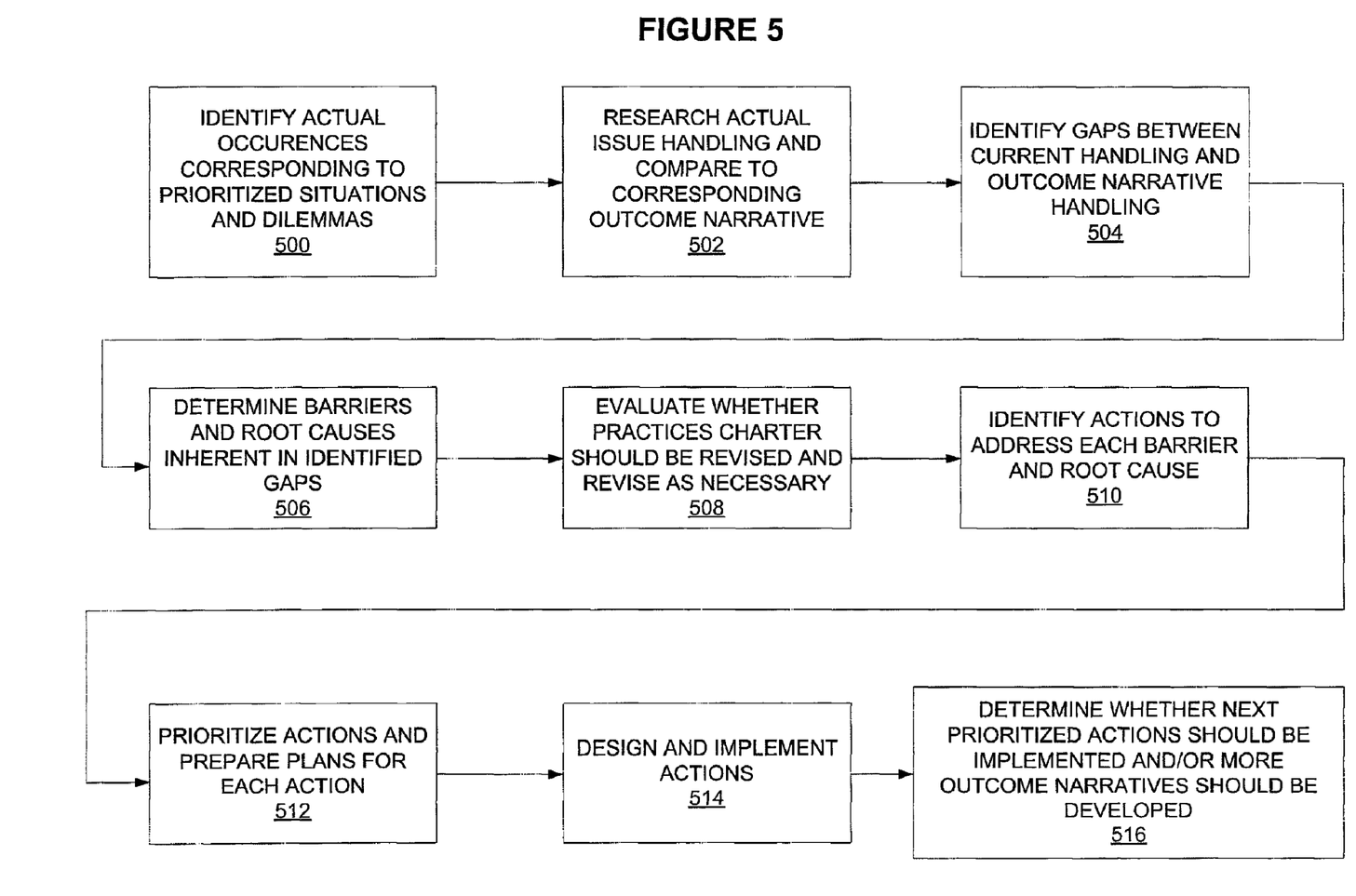
FIG. 5 is a process flow diagram illustrating progress evaluation and the design of further actions.

Progress is evaluated using outcome narratives to identify achievements and target areas needing further improvement and additional actions. Shown in FIG. 5 is an evaluation process flow diagram. In a progress evaluation phase, occurrences of issues that map to prioritized situations and dilemmas contained in outcome narratives are identified in step 500. Actual results and business practices are researched and compared to an outcome narrative description of a desired outcome in step 502 along with role behaviors and actions; thus, identification of gaps, barriers, root causes of gaps is facilitated for steps 504 and 506, respectively.

TABLE 6

Prioritized Action Plan
Prioritized Action Program 1.
2.
3.
4. Change the levels of authority by role and add defined guidelines, ranges, and exception guidance
5. Clarify the type, degree and timing for involvement of Business Advisors, with a focus on communicating their role as advisors and decision support
6. Develop mechanisms for tracking the ultimate outcome of relationship manager decisions and design associated action processes for coaching, correcting and recognizing those outcomes, as appropriate
7.
8. Communicate to client-facing leaders and Business Advisors the need for more acceptance of risk associated with individual decision making
9.
10.
11.
12. Build mechanisms to identify and openly recognize leaders across the organization who focus on building consensus for decisions
13.

TABLE 7

Evaluation Phase of Outcome Narratives and Prioritization Action Plan

Situation/Dilemma Statement: A disagreement exists between a relationship manager who wants to get approval for a proposed customer contract and the Finance manager that needs to approve that contract. The disagreement centers around the relationship manager's level of authority since the contract value is above

TABLE 7-continued

Evaluation Phase of Outcome Narratives and Pioritization Action Plan official authority levels

| Outcome Narrative | Actual Results and Practices |
| --- | --- |
| Desired Outcome: The relationship executive is responsible for the ultimate decision. The exceptions would be for financial implications that fall more than 2% outside the established levels of authority for that client relationship position. The escalation process for financial issues should be used for the exceptions and other unusual circumstances, and an answer needs to be communicated within 48 business hours | The desired outcome is generally happening. A few difficult situations arose where Finance knew about client issues unknown to the relationship manager, and these issues were not adequately communicated before escalation. However, when escalated, it consistently took longer than 48 business hours to make and communicate the decision. |
| In-Scope Roles: | |
| Client-facing leaders (Relationship Manager) Business advisors (Finance Manager) Role Actions and Behaviors: | The right people were involved in the actual situations that were reviewed. |
| Client-facing Leader: Needs to work actively, and with the intent of true resolution, to understand the reasons behind the objections and what is best for the client and company overall. Needs to seek ways to mitigate the risks and impacts by working collaboratively with Finance. Needs to seek others to help resolve and "mediate" the issues before escalation. Should ensure the next higher level client-facing leader concurs with the decision before implementation if mediation has not resolved the issues. If appropriate, needs to support the escalation process and constructively implement the decision from the escalation process. Should work actively to restore any relationships that suffered during the situation. Business Advisor: Needs to be objective about the concerns and ensure that the risk/issue is serious enough to warrant continued work vs. implementing the relationship leader's preferred course of action. Needs to work collaboratively to mitigate the risks/issues while meeting the client and company requirements. Should engage in "mediation" if an adequate resolution cannot be found. If appropriate, needs to support the escalation process. Should support and enact the final decision, whether it is made by the relationship manager or the escalation process. Should work actively to restore any relationships that suffered during the situation. | Some of the relationship managers waited until the last minute to communicate potential issues to Finance, which seems to be exacerbating some of the relationship issues The relationship managers who had to work through the escalation process were especially frustrated that the decisions took longer than 48 business hours Some members of Finance are still trying to make decisions, rather than advise, in these types of situations The longer and more difficult the situation was, the less likely the people involved worked actively to restore relationships |

Additional Actions Needed

Analyze the reasons that the escalation process is not producing the needed decisions in 48 business hours and develop an action plan to resolve the issues
Communicate the known issues in the escalation process to the relationship managers to reset expectations in the near-term and motivate earlier communication of potential issues to Finance
Coach the members of Finance who are still trying to make decisions in these types of instances In a progress evaluation phase, the need to review and revise a practices charter or associated right-versus-right spectrums is considered, subsequent to identification, in step 508. Actions addressing identified barriers and root causes are identified in step 510, and are prioritized and have plans prepared in step 512. Actions are subsequently designed and implemented in step 514, thus addressing identified gaps, implications, root causes, and barriers. Lastly, in step 516, it is determined whether next prioritized actions should be implemented and whether further outcome narratives are to be developed.

Such a consideration is made to continue the synchronization process into previously-unaddressed areas and to address any new realities or unforeseen changes in an environment or business practices. Evaluation continues until adequate assurance is made that actual issue handling occurs as identified in the outcome narratives. Evaluation allows an entity or entities to determine whether further identified actions are to be designed and implemented and whether further outcome narratives are to be developed. The following questions are considered in an evaluation:

Were there inconsistencies between actual occurrences? If so, do those differences point to different units in an entity, different points in time, in-scope roles under different leadership, etc.?
Were barriers encountered while attempting to take an appropriate action?
Did unanticipated circumstances arise?
If a desired outcome occurred as defined in an outcome narrative, were in-scope role behaviors performed as defined? If not, why not?
Were certain in-scope actions and behaviors performed, but others neglected?
Did in-scope role behaviors performed by a specified group or unit fail in achieving a desired outcome more frequently than others?

Reconciliation of right-versus-right conflicts and application of decisions to hypothetical issues, gap assessment between outcome narratives and current state of handling, and targeted progress evaluation admits the following benefits:

fewer episodes of strife-producing disagreement between people on what to do and how to do it, increased productivity as people are able to focus on doing the work, rather than deciding what to do and how to do it, reduction of frustration, confusion and resistance due to increased clarity of expectations, enhanced understanding and awareness of detailed expectations that need to be fulfilled, enhanced ability to evaluate and measure progress with respect to targeted changes, decreased risk of failure and delay of targeted business results, and greater empowerment as lower-level personnel understand and readily apply right-versus-right decisions to a specified work context.

CONCLUSION

A system and method has been shown in the above embodiments for the effective implementation of a business practices alignment method. While various preferred embodiments have been shown and described, it will be understood that there is no intent to limit the invention by such disclosure, but rather, it is intended to cover all modifications falling within the spirit and scope of the invention, as defined in the appended claims. For example, the present invention should not be limited by software/program, computing environment, or specific computing hardware.

The invention claimed is:

1. An article of manufacture having computer storage medium storing computer readable program code executable by a computer to implement a method of synchronizing at least one of: business practices and culture of one or more participating entities, said computer storage medium comprising:
   a. computer readable program code eliciting at least one of: intent and goals from each of said participating entity or entities in said synchronization;
   b. computer readable program code developing detailed alternatives statements in support of said elicited intent and goals;
   c. computer readable program code selecting from said alternatives statements, pairs of alternatives statements that are in tension with each other, said pairs of alternatives statements reflecting an unevenly weighted right-versus-right spectrums in which said pairs of alternatives statements are displayed as end points on said right-versus-right spectrum consisting of at least five check boxes, the check boxes adjacent to the end point alternatives statements being labeled 100% and the middle check box being labeled 50/50, and with the remaining boxes corresponding to unevenly weighted answers between 100% and 50/50, said right-versus-right spectrum defining conflicting and overlapping alternatives, and incorporating attributes and behaviors, principles and values, and business practice drivers comprising mindsets, expectations and work style, said right-versus-right spectrums are evaluated for reasonableness by verifying that, for each of said right-versus-right spectrums, one or more members of said participating entity or entities agrees that said right-versus-right spectrum is important, said alternatives statement pairs are drafted as plausible, contrasting ends of said right-versus-right spectrum; said contrasting ends not required to be equally plausible;
   d. computer readable program code reconciling said pairs of alternatives statements;
   e. computer readable program code establishing a charter of practices by integrating a set of said reconciled pairs of alternatives statements;
   f. computer readable program code synchronizing at least one of said business practices and culture of said participating entity or entities in view of said practices charter wherein said practices charter reflects strategic, operational and tactical alternatives of how said entity or entities are to be operated and how work is to be performed within said entity or entities, and a conveyance of said reconciled pairs of alternatives statements to realistic work conditions is made such that it is clear to people performing the work, how work is to be conducted, and
   said reconciled pairs of alternatives statements are applied to realistic work conditions to produce a series of outcome narratives each of which comprises:
      (1) either of: a situation or dilemma statement;
      (2) a desired outcome in which answers are given to a list of questions about actions to be taken, roles of decision makers, and behaviors associated with those who need to take action;
      (3) a list of in-scope roles, an in-scope role being performed by one or more individuals involved in an action according to said desired outcome;
      (4) role behaviors and actions associated with in-scope roles, wherein role behaviors and actions specify the desired way the desired outcome is to be accomplished; and
      (5) other applicable considerations that specify additional information that could be important in translating the details of the outcome narrative to other issues that have similar characteristics.

2. The article of manufacture of claim 1, wherein creation of said situations and dilemmas statements comprises:
   a. computer readable program code listing issues that might arise within the regular work of said entity or entities, an issue being a work requirement, occurrence, or choice that requires action by one or more people and that could be disputed by those required to take action or responsible for an outcome, and for which one or more reconciled statements will apply;
   b. computer readable program code classifying issues as situations and dilemmas, a situation being an issue with a relatively small number of roles or a generally agreed upon preferable outcome and a dilemma being an issue with a relatively large number of roles or general disagreement on preferable outcome; and
   c. computer readable program code writing a statement to represent each classified situation and dilemma, each statement being a brief, realistic, fictional narrative instantiation with adequate detail for decision, adequacy being determined by comparison to a given set of standard examples.

* * * * *